F. C. KOTZE.
VEHICLE TIRE.
APPLICATION FILED JAN. 17, 1918.

1,269,459.

Patented June 11, 1918.
2 SHEETS—SHEET 1.

Witness
H. Woodard

Inventor
F. C. Kotze
By
Attorneys

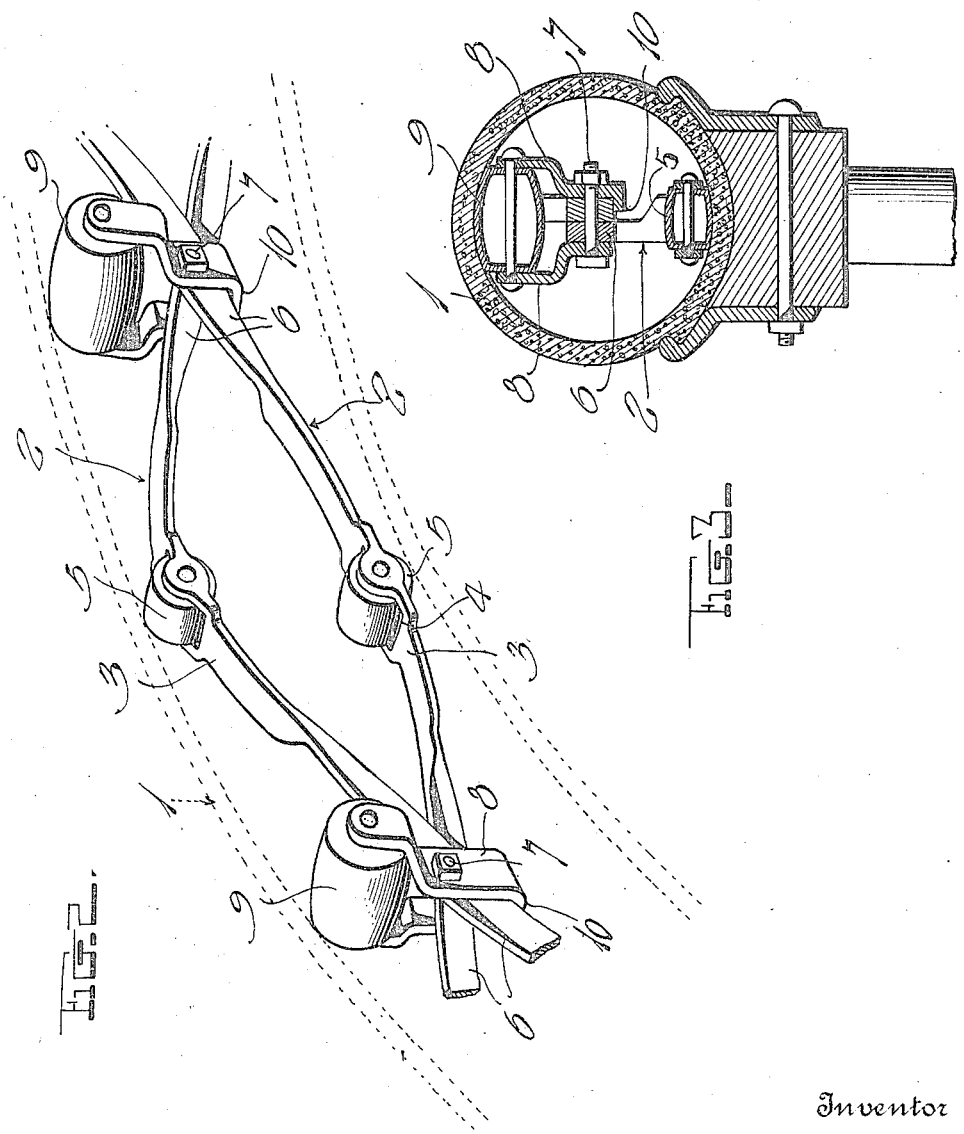

UNITED STATES PATENT OFFICE.

FRANK C. KOTZE, OF NEWARK, NEW JERSEY.

VEHICLE-TIRE.

1,269,459. Specification of Letters Patent. Patented June 11, 1918.

Application filed January 17, 1918. Serial No. 212,250.

*To all whom it may concern:*

Be it known that I, FRANK C. KOTZE, a citizen of the United States, residing at 73 William st., Newark, in the county of Essex and State of New Jersey, have invented certain new and useful Improvements in Vehicle-Tires; and I do declare the following to be a full, clear, and exact description of the invention, such as will enable others skilled in the art to which it appertains to make and use the same.

My invention has for its object to provide a comparatively simple and inexpensive, yet a highly efficient and durable tire for automobiles and other vehicles, which will possess all of the advantages of the pneumatic tire without the disadvantages thereof; and with this general object in view the invention resides in the novel features of construction and unique combinations of parts to be hereinafter fully described and claimed, the descriptive matter being supplemented by the accompanying drawings which form a part of this specification and in which:

Fig. 2 is a sectional perspective view of a portion of the tire; and,

Fig. 3 is a transverse section on the line 3—3 of Fig. 1.

Figure 1:
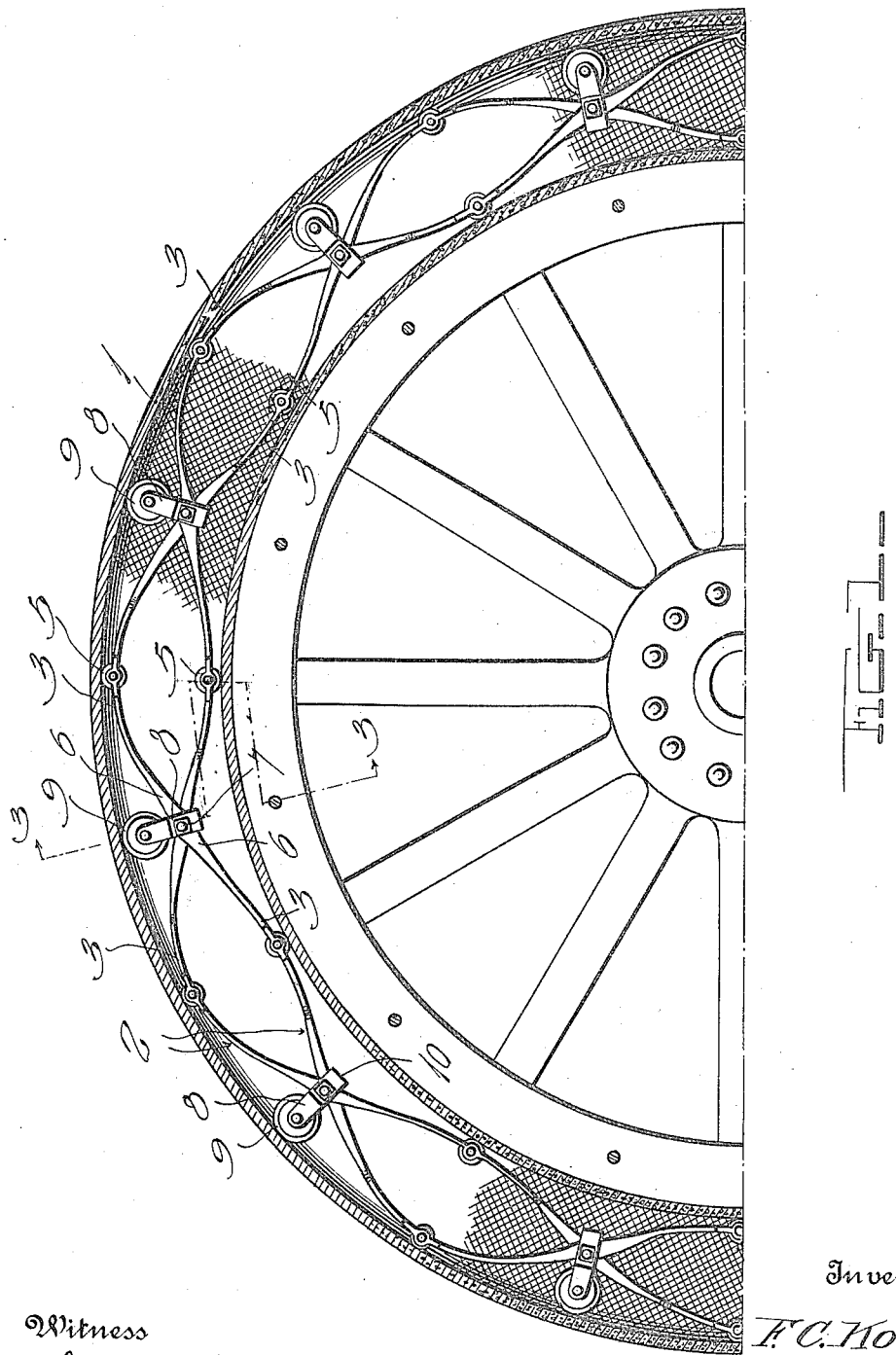
Figure 1 is a sectional view of the improved tire applied to an automobile wheel.

In the drawings above briefly described, the numeral 1 designates a continuous tire casing formed of any suitable material, but preferably woven from wire cables as suggested in the drawings.

Located within the casing 1 and extending throughout the circumference thereof, are two continuous springs 2, each of said springs being of zigzag formation with its vertices 3 located alternately at the tread and rim portions of the casing, said vertices having openings 4 in which rollers 5 are mounted for engaging the casing, the periphery of said rollers being preferably curved longitudinally as shown for proper contact with the casing wall. Between their vertices 3, the springs 2 are preferably flattened as shown at 6 and these flattened portions cross each other, being pivoted together by bolts or the like 7. Radial arms 8 have their inner ends mounted on the bolts 7 and between their outer ends said arms carry additional rollers 9 for engagement with the tread portion of the casing 1, said rollers being by preference larger than the rollers 5 but being similarly shaped.

In order to prevent tilting of the arms 8, the inner end of one of each pair of arms is preferably bent laterally inward as shown at 10 into engagement with the flattened and crossed portions 6 of the springs. This construction is preferable, but other equivalent arrangement could well be employed.

The improved tire may be constructed at comparatively small cost and it may be easily applied to the wheels upon which it is to be used; and when in use, the device will be highly efficient not only for preventing skidding and insuring an effective traction engagement with the roadway, but for absorbing shocks and jars, it being understood that the construction of the springs 2 will permit them to yield inwardly when obstructions are encountered by the tire.

Since probably the best results are obtained from the several specific details shown and described, these details are by preference employed, but within the scope of the invention as claimed, numerous minor changes may well be made.

I claim:

1. A vehicle tire comprising a casing, two continuous springs in said casing extending throughout the circumference thereof, said springs being of zigzag shape and crossing each other between their vertices, said vertices being located alternately at the rim and tread portions of the casing, rollers carried by said vertices and engaging said tread and rim portions of the casing, pivots connecting said springs at their crossing points, and additional rollers carried by the crossed portions of said springs and engaging the tread portion of the casing.

2. A structure as specified in claim 1, the carrying means of each of said additional rollers comprising a pair of arms mounted at their inner ends on the adjacent pivot, the outer ends of said arms receiving said rollers therebetween, the inner end of one arm of each pair being bent laterally into engagement with one of the springs to prevent tilting of said arms.

In testimony whereof I have hereunto set my hand in the presence of two subscribing witnesses.

FRANK C. KOTZE.

Witnesses:
WILLIAM PROUT,
RICHARD J HURD.